United States Patent [19]

Suzuki et al.

[11] Patent Number: 5,075,408

[45] Date of Patent: Dec. 24, 1991

[54] POLYURETHANE POLYMERS

[75] Inventors: Takashi Suzuki, Kakogawa; Noburu Nishikawa, Kobe; Tomio Shimizu, Akashi; Toshi Imai; Shizuo Baba, both of Hyogo; Muneharu Taguchi; Shigeki Kitaoka, both of Kako, all of Japan

[73] Assignee: Toyo Tire & Rubber Co., Ltd., Osaka, Japan

[21] Appl. No.: 508,542

[22] Filed: Apr. 10, 1990

Related U.S. Application Data

[63] Continuation of Ser. No. 239,999, Sep. 1, 1988, abandoned.

[30] Foreign Application Priority Data

Sep. 2, 1987 [JP] Japan .............................. 62-219881

[51] Int. Cl.$^5$ ...................... C08G 18/32; C08G 18/48
[52] U.S. Cl. ...................................................... 528/76
[58] Field of Search .................................... 528/76, 77

[56] References Cited

U.S. PATENT DOCUMENTS

| 4,409,383 | 10/1983 | Zalucha et al. | 528/499 |
| 4,789,720 | 12/1988 | Teffenhart | 528/76 |
| 4,792,576 | 12/1988 | Nodelman | 528/76 |
| 4,810,582 | 3/1989 | Gould et al. | 428/423.1 |
| 4,870,150 | 9/1989 | Bandlish et al. | 528/76 |
| 4,945,149 | 7/1990 | Matsumoto et al. | 528/77 |

Primary Examiner—Maurice J. Welsh
Assistant Examiner—Rabon Sergent
Attorney, Agent, or Firm—Koda and Androlia

[57] ABSTRACT

Polyurethane polymers of 15 to 60% in ethylene oxide content obtained by causing a base polymer, which is comosed of polyethylene glycol of 200 to 600 in average molecular weight and polyalkyl ether polyol which is 500 to 3000 in average molecular weight and in which C=3 or above, to react with polyisocyanate in the range of 20 to 100% of the polyethylene glycol in the base polymer. A chain extending agent may be used together during the reaction. The polymers have high moisture permeability which is 1500 g/m$^2$.24 hr./20 $\mu$or above, a low swelling ratio that is 10% or below, 100% modulus is 30 kg/cm$^2$ or above, and satisfactory toughness.

2 Claims, No Drawings

POLYURETHANE POLYMERS

This is a continuation of application Ser. No. 239,999, filed Sept. 1, 1988, now abandoned.

BACKGROUND OF THE INVENTION

1. Field of the Invention

The present invention relates to polyether type non-porous polyurethane polymers excellent in moisture permeability, degree of swelling, and toughness and more particularly to polyurethane polymers which are useful for applications in a form of film and coating film.

2. Prior Art

In the past, materials which allow vaporized water, such as moisture, to permeate but do not allow the liquid water, such as rainwater, to permeate have been strongly sought after commercially. Products available in accordance with such demands are those, which utilize microporosity in which films are made microporous by stretching high crystalline tetrafluororesin and microporosity of urethane films made by a wet process. Non-porous films made of amino acid resins which utilize hydrophilic permeability, etc. are also available As a method to provide polyurethane polymers which are a hydrophilic, it is well known that block copolymers of polyoxypropylene and polyoxyethylene or polyoxyethylene glycol may be used as a polyol component. It is also widely known that polyurethane hydrogel, which has the ability to absorb water several times over its weight, can be obtained by causing isocyanate terminal prepolymers, which are obtained from polyoxyethylene glycol of 4000 to 25,000 molecular weight and organic diisocyanate, to lightly cross-link with an equivalent amount of water or organic polyamine. (Japanese Laid-Open [Kokai] Patent Application No. 1976-13891).

Conventional microporous films have had some defects. Particularly, moisture permeability becomes lower when stains accumulate thereon; water pressure resistance decreases when the film is stretched, and the strength or toughness of the film itself is relatively low. Also, conventional non-porous films are defective in that some of them do not have sufficient moisture permeability, some of them are inferior in a long-term water-resistance since they have a high swelling ratio, and some of them are low in modulus of elasticity. Thus, they do not have appropriate physical properties to be used as films.

In addition, the moisture permeability of the non-porous film is almost reversely proportional to the thickness of the film. As a result, in order to obtain high moisture permeability, it is necessary to reduce the thickness of the film. For implementing thin films, the films must have appropriate modulus of elasticity (modulus).

SUMMARY OF THE INVENTION

The present invention intends to solve the above described problems, the object of the invention being to provide polyurethane polymers which are non-porous and have high moisture permeability.

Another object of the invention is to provide polyurethane polymers which have compositions that bring about the desirable properties of hydrolysis resistance and a low degree of swelling, thereby preventing deterioration of physical properties of the film for a long period of time.

Still another object of the present invention is to provide polyurethane polymers which can provide a sufficient elastic modulus even in a form of thin film.

In order to accomplish the above described objects, this invention provides polyurethane polymers obtained from a base polymer which comprises polyethylene glycol and polyalkylether polyol. Polyisocyanate is reacted with the base polymer, with a chain extending agent, if necessary, so that the ethylene oxide content of the resulting polyurethane polymer falls within 15-60%.

DETAILED DESCRIPTION OF THE INVENTION

More specifically, a relatively low molecular weight polyethylene glycol of 200 to 600 in average molecular weight is selected by taking into consideration a balance among the properties of high moisture permeability, low degree of swelling, relatively high modulus, etc.

A polyalkylether polyol with $C=3$ or above having an average molecular weight of 500 to 3000 is selected for the purpose of providing characteristics other than those mentioned above.

The above described polyethylene glycol and polyalkylether polyol are used as the base polymer. Then, within the range of 20 to 100% in polyethylene glycol content in the base polymer, a polyisocyanate is reacted thereto so that, with the additional use of chain extending agent, if necessary, the content of ethylene oxide in the thus obtained polyurethane polymers is in the range of 15 to 60%.

In order to form the polyurethane polymers so that they are usable, the following physical properties in a form of $20\mu$ thick film are necessary as the standard:

The moisture permeability is 1500 $g/m^2.24$ hr. or above,

The ratio of swelling is 10% or below, and

The 100% modulus is 30 $kg/cm^2$ or above.

In selecting the polyethylene glycol for forming the polyurethane polymers of this invention, the average molecular weight of the polyethylene glycol is set to be in the range of 200 to 600, which is relatively low. The reason for this is that if the molecular weight is lower than that, the moisture permeability tends to be low; while, if the molecular weight is higher, the degree of swelling tends to be high. Furthermore, if the molecular weight is low, the modulus tends to be high; while if the molecular weight is high, the modulus tends to be low. Accordingly, a range of 200 to 600 is selected for the average molecular weight so that the physical properties suitable for the respective uses can be obtained for all of the various applications of the present invention as will be clear from the Embodiments and the Comparison Examples which will be described below.

Also, as to polyalkylether polyol with $C=3$ or above, which is used along with the polyethylene glycol, those in the range of 500 to 3000 in average molecular weight are selected in consideration of suitable physical properties. The reason for this is that if the average molecular weight is 500 or below, the modulus becomes high and elasticity is inferior. On the other hand, if the average molecular weight is 3000 or above, the modulus tends to be low and the strength or toughness becomes low as will be apparent from the Embodiments and the Comparison Examples.

The linear molecular structures of polypropylene glycol (PPG), polytetramethylene glycol (PTMG), etc. are mainly used as the polyalkylether polyol in this invention; however, a trifunctional component (e.g., polypropylene ether triol) may be used together with the above described substances in order to modify some of the characteristics such as the melting point, tensile characteristics, surface smoothness, etc. In this case, it should be noted that when the number of branches is increased, the liquid property of the thermoplastic urethane polymer solution becomes degraded (gelatiniform-gelatinization occurs). Thus, the amounts to be used together would be restricted (see Sample No. 6 of the Embodiment).

As to the organic polyisocyanate, hexamethylene diisocyanate (HDI), xylylene diisocyanate (XDI), isophorone diisocyanate (IPDI), and dicyclohexylmethane-4,4'-diisocyanate are preferable. However, when discoloration is acceptable, the conventionally known toluene diisocyanate (TDI), dimethylmethane diisocyanate (MDI), crude MDI, etc. are all usable. Also, prepolymers and adducts of polyol and isocyanate, or if necessary, organic polyisocyanates of tri-or-higher functional may be used concurrently. However, when using substances containing polyol in the isocyanate components, such as prepolymers and adducts, it is necessary to note their influence on the final polyoxyethylene content ratio at the time when the polyurethane polymers are formed.

As to the chain extending agent, all of those conventionally known may be used. For example, diols such as ethylene glycol, 1,4-butanediol, 1,6-hexane glycol, etc.; diamines, such as 4,4'-methylenebis-(2-chloroaniline), isophorone diamine, piperazine, ehtylenediamine, etc.; and aminoalcohols, such as monoethanolamine, N-methyldiethanolamine, etc., may be used. In addition, trifunctional compounds, such as trimethylolpropane, glycerol, etc., may also be used.

The method of preparation is composed of two steps (two step method) in which the base polymers composed of relatively low molecular weight polyethylene glycol and polyol are concurrently turned into prepolymers by causing the base polymers to react with organic polyisocyanate, and then turned into the objective polymers using the chain extending agent. However, for example, when glycol is used as the chain extending agent, a one step method, which forms the objective polymers directly, may be used in which organic polyisocyanate is reacted with a mixture of the polyethylene glycol and the chain extending agent. Another type of one step method can be used in which organic polyisocyanate is caused to react with polyethylene glycol and the concurrently used polyol, without using a chain extending agent, thereby forming the polymers directly.

As to the solvent used in the method of preparation of this invention, N,N-dimethyl formamide (DMF), a mixture of DMF and toluene, a mixture of methyl ethyl ketone (MEK), toluene and isopropyl alcohol (IPA), etc. are preferable.

The polyether type, non-porous polyurethane polymers, which contain ethylene oxide in the range of 15-60% obtained in accordance with the present invention, are high in moisture permeability, thereby providing a superior moisture permeating property. Also, the permeation performance of the polyurethane polymers does not decrease because of a low degree of swelling. In addition, the polymers exibit an appropriate degree of elasticity and toughness when they are formed into thin film.

Examples of the embodiments of the polyurethane polymers of this invention will be shown in Table 1 (Tables 1-1, 2, 3 and 4), and comparison examples are shown in Table 2 (Table 2-1 and 2). The terms in the Tables are defined as follows:

PEG-Polyethylene glycol
PTMG-Polytetramethylene glycol (An example of polyol used concurrently)
PPET-Polypropylene ether triol (An example of polyol used in combination)
IPDI-Isophorone diisocyanate
P-MDI-Pure-diphenylmethane diisocyanate
X-DI-Xylylene diisocyanate
IPDA-Isophorone diamine
EG-Ethylene glycol
EO%-Ethylene oxide content
$M_{100}$-Modulus at 100% extension ratio
Tb-Breaking strength
Eb-Elongation (extension) at the breaking point In the Tables, measurement of the swelling ratio was determined in the following manner:

Reference lines were first impressed at intervals of 100 mm on a sample film of 20μ (thickness)×30 mm (width)×150 mm (length). Then, the film was immersed in water for 24 hours at room temperature. After 24 hours, the film was taken out of the water, and the distance (l) among the reference lines was measured immediately thereafter. The swelling ratio (%) was measured using the following equation:

$$\text{Swelling ratio (\%)} = \frac{l - 100}{100} \times 100$$

Measurement of the degree of permeability (g/m².24 hr.) was determined using a film of 20μ in thickness, and the measurement was obtained in accordance with the method of JIS Z0208.

Embodiments

TABLE 1-1

| Ingredients | Sample No. 1 Parts by weight | Sample No. 1 Component ratio (%) | Sample No. 2 Parts by weight | Sample No. 2 Component ratio (%) |
|---|---|---|---|---|
| PEG 400 | 80 | 42.78 | — | — |
| PEG 600 | — | — | 70 | 38.91 |
| PTMG 2000 | 20 | 10.70 | 30 | 16.68 |
| IPDI | 70 | 37.43 | 58.6 | 32.57 |
| IPDA | 17 | 9.09 | 21.3 | 11.84 |
| Total | 187 | 100.00 | 179.9 | 100.00 |
| PEG/POLYOL | 80/20 | | 70/30 | |
| NCO/OH ratio of Prepolymers | 1.5 | | 2.0 | |
| Method of preparation | Two Step method | | Two Step Method | |
| EO % | 43 | | 39 | |
| $M_{100}$ (kg/cm²) | 50 | | 70 | |
| Tb (kg/cm²) | 450 | | 400 | |
| Eb (%) | 500 | | 550 | |
| Swelling ratio (%) | 4.0 | | 9.0 | |
| Moisture permeability (g/m² · 24 hr.) | 4200/20μ | | 5000/20μ | |

TABLE 1-2

| Ingredients | Sample No. 3 Parts by weight | Sample No. 3 Component ratio (%) | Sample No. 4 Parts by weight | Sample No. 4 Component ratio (%) |
|---|---|---|---|---|
| PEG 600 | 100 | 51.65 | 20 | 14.68 |
| PTMG 2000 | — | — | 80 | 58.73 |
| P-MDI | 83.3 | 43.03 | — | — |
| IPDI | — | — | 14.65 | 10.76 |
| XDI | — | — | 12.22 | 8.97 |

TABLE 1-2-continued

|  | Sample No. 3 | | Sample No. 4 | |
|---|---|---|---|---|
| Ingredients | Parts by weight | Component ratio (%) | Parts by weight | Component ratio (%) |
| EG | 10.3 | 5.32 | — | — |
| IPDA | — | — | 9.35 | 6.86 |
| Total | 193.6 | 100.00 | 136.22 | 100.00 |
| PEG/POLYOL | 100/0 | | 20/80 | |
| NCO/OH ratio of Prepolymers | — | | 1.8 | |
| Method of preparation | One Step Method | | Two Step Method | |
| EO % | 52 | | 15 | |
| $M_{100}$ (kg/cm$^2$) | 80 | | 40 | |
| Tb (kg/cm$^2$) | 400 | | 450 | |
| Eb (%) | 300 | | 600 | |
| Swelling ratio (%) | 2.0 | | 3.0 | |
| Moisture Permeability (g/m$^2$ · 24 hr.) | 2000/20μ | | 2700/20μ | |

TABLE 1-3

|  | Sample No. 5 | | Sample No. 6 | |
|---|---|---|---|---|
| Ingredients | Parts by weight | Component ratio (%) | Parts by weight | Component ratio (%) |
| PEG 200 | 90 | 31.20 | — | — |
| PEG 400 | — | — | 80 | 34.99 |
| PTMG 2000 | 10 | 3.47 | 20 | 8.75 |
| PPET 3000 | — | — | 15 | 6.56 |
| IPDI | 151.6 | 52.54 | 85.91 | 37.58 |
| IPDA | 36.9 | 12.79 | 27.71 | 12.12 |
| Total | 288.5 | 100.00 | 228.62 | 100.00 |
| PEG/POLYOL | 90/10 | | 80/20 | |
| NCO/OH ratio of Prepolymers | 1.5 | | 1.8 | |
| Method of preparation | Two Step Method | | Two Step Method | |
| EO % | 31 | | 33 | |
| $M_{100}$ (kg/cm$^2$) | 150 | | 70 | |
| Tb (kg/cm$^2$) | 300 | | 480 | |
| Eb (%) | 250 | | 450 | |
| Swelling ratio (%) | 0 | | 2.0 | |
| Moisture permeability (g/m$^2$ · 24 hr.) | 2300/20μ | | 3500/20μ | |

TABLE 1-4

|  | Sample No. 7 | |
|---|---|---|
| Ingredients | Parts by weight | Component ratio (%) |
| PEG 400 | 50 | 36.364 |
| PTMG 2000 | 50 | 36.364 |
| P-MDI | 37.5 | 27.272 |
| Total | 137.5 | 100.00 |
| PEG/POLYOL | 50/50 | |
| NCO/OH ratio of Prepolymers | — | |
| Method of preparation | One Step Method | |
| EO % | 50 | |
| $M_{100}$ (kg/cm$^2$) | 100 | |
| Tb (kg/cm$^2$) | 400 | |
| Eb (%) | 400 | |
| Swelling ratio (%) | 1.0 | |
| Moisture permeability (g/m$^2$ · 24 hr.) | 2300/20μ | |

COMPARISON EXAMPLES

TABLE 2-1

|  | Sample No. 11 | | Sample No. 12 | |
|---|---|---|---|---|
| Ingredients | Parts by weight | Component ratio (%) | Parts by weight | Component ratio (%) |
| PEG 1000 | 80 | 51.75 | 20 | 14.67 |
| PTMG 2000 | 20 | 12.94 | 80 | 58.68 |
| IPDI | 39.96 | 25.85 | 26.64 | 19.54 |
| IPDA | 14.62 | 9.46 | 9.69 | 7.11 |
| Total | 154.58 | 100.00 | 136.33 | 100.00 |
| PEG/POLYOL | 80/20 | | 20/80 | |
| NCO/OH ratio of Prepolymers | 2.0 | | 2.0 | |
| Method of preparation | Two Step Method | | Two Step Method | |
| EO % | 52 | | 15 | |
| $M^{100}$ (kg/cm$^2$) | 28 | | 25 | |
| Tb (kg/cm$^2$) | 380 | | 420 | |
| Eb (%) | 500 | | 550 | |
| Swelling ratio (%) | 27 | | 11 | |
| Moisture permeability (g/m$^2$ · 24 hr.) | 5800/20μ | | 3500/20μ | |

TABLE 2-2

|  | Sample No. 13 | | Sample No. 14 | |
|---|---|---|---|---|
| Ingredients | Parts by weight | Component ratio (%) | Parts by weight | Component ratio (%) |
| PEG 1000 | 50 | 26.19 | 100 | 61.96 |
| PTMG 500 | 50 | 26.19 | — | — |
| IPDI | 66.6 | 34.89 | 44.4 | 27.51 |
| IPDA | 24.31 | 12.73 | 17.0 | 10.53 |
| Total | 190.91 | 100.00 | 161.4 | 100.00 |
| PEG/POLYOL | 50/50 | | 100/0 | |
| NCO/OH ratio of Prepolymers | 2.0 | | 2.0 | |
| Method of preparation | Two Step Method | | Two Step Method | |
| EO % | 26 | | 62 | |
| $M_{100}$ (kg/cm$^2$) | 70 | | 28 | |
| Tb (kg/cm$^2$) | 370 | | 400 | |
| Eb (%) | 250 | | 600 | |
| Swelling ratio (%) | 15 | | 34 | |
| Moisture permeability (g/m$^2$ · 24 hr.) | 2500/20μ | | 6000/2μ | |

As is clear from the Embodiments (Samples No. 1 through No. 7) and the Comparison Examples (Samples No. 11 through No. 14), when the average molecular weight of the polyethylene glycol is as low as 200, such as in Sample No. 5, even if a small amount of polyol is used concurrently, the resulting swelling ratio is 0%, the coefficient of moisture permeability tends to decrease, and the 100% modulus shows a very high value. Accordingly, it is clear that the desirable molecular weight of the polyethylene glycol is 200 or above.

When polyethylene glycol is used as a single component, such as in Sample No. 3, and the average molecular weight is 600, the 100% modulus is somewhat decreased, and although the moisture permeability is not increased very much, the swelling ratio shows a tendency to increase.

Also, as shown in Sample Nos. 1 and 2, when a chain extending agent and, as the base polymers, polyethylene glycol and other concurrent-use polyol are used, the urethane polymers obtained show a tendency to have remarkably satisfactory moisture permeability, though the swelling ratio is somewhat increased.

As is apparent from the above, when the molecular weight of the polyethylene glycol is low, the swelling ratio becomes low and the 100% modulus becomes high, while when the molecular weight of the polyethylene glycol is increased, the moisture permeability tends to become high. Also, in the polyol for concurrent-use, as the molecular weight increases, exceeding 500, moisture permeability becomes higher, and also the swelling ratio becomes higher.

Consequently, by considering the balance among the values of the desired swelling ratio, moisture permeability, 100% modulus, etc., adjusting the average molecular weight of the polyethylene glycol between 200 to 600, and combining the concurrent-use polyol in an average molecular weight of 500 to 3000, a specified and necessary swelling ratio, moisture permeability and modulus value may be obtained. Needless to say, aside from glycol, a trifunctional polyol may be used partially as the polyol for cuncurrent use as seen from the Sample No. 6. Furthermore, as shown in the embodiment of Sample No. 7, even when a chain extending agent is not used, values of about 1.0% for the swelling ratio, and approx. 2300/2$\mu$ for moisture permeability, can be obtained.

Depending upon the applications, desired combinations of the compositions are selected. However, from an overall standpoint, those preferably used are polyurethane polymers obtained from a compositional combination of base polymers composed of polyethylene glycol and concurrent-use polyol, organic polyisocyanate, and a chain extending agent.

The polyurethane polymers according to the present invention have, as mentioned above, superior operational functions. Therefore, while they allow moisture permeation their hydrolysis resistance is kept at a satisfactory level, and the degree of deterioration of physical properties caused during long-term use is less. Thus, they are capable of maintaining excellent moisture permeability for a long period of time. In addition, they retain the above described characteristics even if in the form of a thin film and also maintain an appropriate degree of elasticity and toughness over a long time.

We claim:

1. Non-porous moisture permeable polyurethane materials having superior characteristics in a form of film and coating film including high moisture permeability, a low degree of swelling, and satisfactory toughness, which are obtained by reacting base polymers with polyisocyanate, said base polymers being polyethylene glycol having an average molecular weight of 200 to 600 or the mixture thereof with polytetramethylene glycol having an average molecular weight of 2000 wherein the content of polyethylene glycol in said base polymers is in the range of 20 to 100% and said polyurethane materials having ethylene oxide content of 15 to 60% and having such characteristics that the moisture permeability is at least 1500 g/m$^2$ 24 hr./20$\mu$, the swelling ratio is at highest 10%, and the 100% modulus is at least 30 kg/cm$^2$.

2. Non-porous moisture permeable polyurethane materials according to claim 1, wherein chain extending agent is used when said polyisocyanate is reacted with said base polymers.

* * * * *

UNITED STATES PATENT AND TRADEMARK OFFICE
CERTIFICATE OF CORRECTION

PATENT NO. : 5,075,408
DATED : Dec. 24, 1991
INVENTOR(S) : TAKASHI SUZUKI, et al.

It is certified that error appears in the above-identified patent and that said Letters Patent is hereby corrected as shown below:

On the title page:

Column [75] Inventors: Change the name of the fourth Inventor in the third line "Toshi Imai" to --Toshio Imai--

Signed and Sealed this

Tenth Day of August, 1993

Attest:

MICHAEL K. KIRK

*Attesting Officer*   *Acting Commissioner of Patents and Trademarks*